US012044071B2

(12) United States Patent
Kirby

(10) Patent No.: US 12,044,071 B2
(45) Date of Patent: *Jul. 23, 2024

(54) SEMI-RIGID CHAIN ASSEMBLY

(71) Applicant: Lutron Technology Company LLC, Coopersburg, PA (US)

(72) Inventor: David A. Kirby, Zionsville, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/177,924

(22) Filed: Mar. 3, 2023

(65) Prior Publication Data

US 2023/0203885 A1 Jun. 29, 2023

Related U.S. Application Data

(63) Continuation of application No. 17/397,144, filed on Aug. 9, 2021, now Pat. No. 11,643,875, which is a (Continued)

(51) Int. Cl.
*E06B 9/78* (2006.01)

(52) U.S. Cl.
CPC .......... *E06B 9/78* (2013.01); *E06B 2009/785* (2013.01)

(58) Field of Classification Search
CPC ........ E06B 9/78; E06B 2009/785; E06B 9/40; E06B 9/42; E06B 9/322; E06B 9/326;
(Continued)

(56) References Cited

U.S. PATENT DOCUMENTS 1,270,143 A * 6/1918 Gagnon .................. F16G 13/12 174/138 B
1,468,169 A * 9/1923 Rundell ............... A44C 11/002 59/84

(Continued)

FOREIGN PATENT DOCUMENTS

EP 2458128 A1 5/2012
GB 2496639 A * 5/2013 ............. E06B 9/326

(Continued)

OTHER PUBLICATIONS

Office Action issued for corresponding Canadian Patent Application No. 3,086,296 issued Jul. 28, 2021.

*Primary Examiner* — Abe Massad
(74) *Attorney, Agent, or Firm* — Duane Morris LLP

(57) ABSTRACT

A manually-operated window treatment system may include a roller tube, a covering material, and a semi-rigid chain assembly. The covering material may be attached to the roller tube and may be operable between a raised position and a lowered position via rotation of the roller tube. The semi-rigid chain assembly may be configured to be operated by a user to rotate the roller tube. The semi-rigid chain assembly may be configured to limit the size of a loop that can be formed by the semi-rigid chain assembly. The semi-rigid chain assembly may be operatively coupled to a drive pulley of the window treatment system. The semi-rigid chain assembly may include flexible outer housing and a stiffening rod. The flexible housing may surround and operate along the stiffening rod. The hollow chain may include multiple links that are connected together to form a continuous loop.

22 Claims, 3 Drawing Sheets

Related U.S. Application Data continuation of application No. 16/227,148, filed on Dec. 20, 2018, now Pat. No. 11,118,397.

(60) Provisional application No. 62/607,974, filed on Dec. 20, 2017.

(58) Field of Classification Search
CPC .......... F16G 13/06; F16G 13/07; F16G 13/10; F16G 13/16; F16G 13/18; F16G 13/22
See application file for complete search history.

(56) References Cited

U.S. PATENT DOCUMENTS

| | | | | | |
|---|---|---|---|---|---|
| 1,693,457 | A | | 11/1928 | Pagano | |
| 1,939,766 | A | | 12/1933 | Corset | |
| 1,947,113 | A | * | 2/1934 | Russell | A44C 11/002 59/35.1 |
| 2,554,331 | A | | 5/1951 | Hunter | |
| 4,565,282 | A | * | 1/1986 | Olsson | B65G 17/385 198/833 |
| 4,767,386 | A | | 8/1988 | Spaggiari | |
| 4,810,238 | A | | 3/1989 | Pazdernik | |
| 5,465,775 | A | | 11/1995 | Biba et al. | |
| 5,472,035 | A | | 12/1995 | Biba et al. | |
| 5,513,687 | A | | 5/1996 | Tuzmen et al. | |
| 5,553,649 | A | | 9/1996 | Chisaka et al. | |
| 5,553,653 | A | | 9/1996 | Rozon | |
| 5,671,793 | A | | 9/1997 | Lee | |
| 5,722,478 | A | | 3/1998 | Claypool et al. | |
| 5,749,405 | A | | 3/1998 | Huang | |
| 5,797,441 | A | | 8/1998 | Benthin | |
| 5,850,863 | A | | 12/1998 | Huang | |
| 5,914,198 | A | | 5/1999 | Huang | |
| 6,085,824 | A | | 7/2000 | Cadorette | |
| 6,193,624 | B1 | * | 2/2001 | Lund | F16H 7/18 74/216.3 |
| 6,196,293 | B1 | | 3/2001 | Lee | |
| 6,360,806 | B1 | | 3/2002 | Bowman et al. | |
| 6,516,860 | B1 | | 2/2003 | Weaver et al. | |
| 6,644,374 | B2 | | 11/2003 | Nien | |
| 6,752,194 | B1 | | 6/2004 | Huang | |
| 6,955,208 | B2 | | 10/2005 | Kim | |
| 7,272,922 | B2 | | 9/2007 | Fahrion | |
| 7,294,078 | B2 | | 11/2007 | He et al. | |
| 7,975,838 | B2 | | 7/2011 | Reist | |
| 8,286,686 | B2 | | 10/2012 | Cannaverde | |
| 8,491,430 | B1 | | 7/2013 | Swartz | |
| 8,607,541 | B1 | | 12/2013 | Cavuoti | |
| 8,950,463 | B2 | | 2/2015 | Vestal et al. | |
| 9,038,696 | B2 | | 5/2015 | Lava et al. | |
| 2004/0083709 | A1 | | 5/2004 | Ikeda et al. | |
| 2004/0084573 | A1 | | 5/2004 | Komiya | |
| 2011/0034257 | A1 | * | 2/2011 | Wen | H02G 3/0475 464/173 |
| 2011/0079757 | A1 | | 4/2011 | Manvel | |
| 2012/0090795 | A1 | | 4/2012 | Kirby | |
| 2018/0171705 | A1 | | 6/2018 | Marocco | |
| 2018/0238109 | A1 | | 8/2018 | Kanargelidis et al. | |
| 2019/0169929 | A1 | | 6/2019 | Zhang | |

FOREIGN PATENT DOCUMENTS

| | | | | | |
|---|---|---|---|---|---|
| GB | 2496639 | A | | 5/2013 | |
| WO | 2015026142 | A1 | | 2/2015 | |
| WO | WO-2015026142 | A1 | * | 2/2015 | E06B 9/326 |

* cited by examiner

SEMI-RIGID CHAIN ASSEMBLY

CROSS-REFERENCE TO RELATED APPLICATIONS

This application is a continuation of U.S. patent application Ser. No. 17/397,144, filed Aug. 9, 2021, which is a continuation of U.S. patent application Ser. No. 16/227,148 (now U.S. Pat. No. 11,118,397), which was filed Dec. 20, 2018 claiming the benefit of U.S. Provisional Patent Application No. 62/607,974, filed Dec. 20, 2017, the entire disclosures of which are hereby incorporated by reference.

BACKGROUND

A window treatment may be mounted in front of one or more windows, for example to prevent sunlight from entering a space and/or to provide privacy. Window treatments may include, for example, roller shades, roman shades, venetian blinds, or draperies. A roller shade typically includes a flexible shade fabric wound onto an elongated roller tube. Such a roller shade may include a weighted hembar located at a lower end of the shade fabric. The hembar may cause the shade fabric to hang in front of one or more windows that the roller shade is mounted in front of.

A typical window treatment can be manually operated or motor operated. In the case of a manually-operated window treatment, the rotation of the roller tube is provided by an input wheel that receives an input chain. The input wheel converts a pulling force applied to the input chain into a rotation force. A typical input chain is a ball chain loop. A safety hold may be installed at the bottom of the ball chain loop such that the input chain is not free hanging.

SUMMARY

As described herein, a manually-operated window treatment system may include a roller tube, a covering material, and a semi-rigid chain assembly. The roller tube may be supported at opposed ends thereof. The covering material may be attached to the roller tube and may be operable between a raised position and a lowered position via rotation of the roller tube. The semi-rigid chain assembly may be configured to be operated by a user to rotate the roller tube. The semi-rigid chain assembly may be configured to limit the size of a loop that can be formed by the semi-rigid chain assembly. The semi-rigid chain assembly may be operatively coupled to a drive pulley of the window treatment system.

The semi-rigid chain assembly may include a flexible outer housing and a stiffening rod. The flexible outer housing may be a hollow chain. The stiffening rod may be a spring steel stiffening rod. The flexible housing may surround and operate along the stiffening rod. For example, the spring steel stiffening rod may be located within the hollow chain. The hollow chain may include multiple links that are connected together to form a continuous loop. The size of the loop may be limited by the stiffness of the stiffening rod. That is, the stiffening rod may be a fixed inner structure that defines a loop.

DETAILED DESCRIPTION

Figure 1:
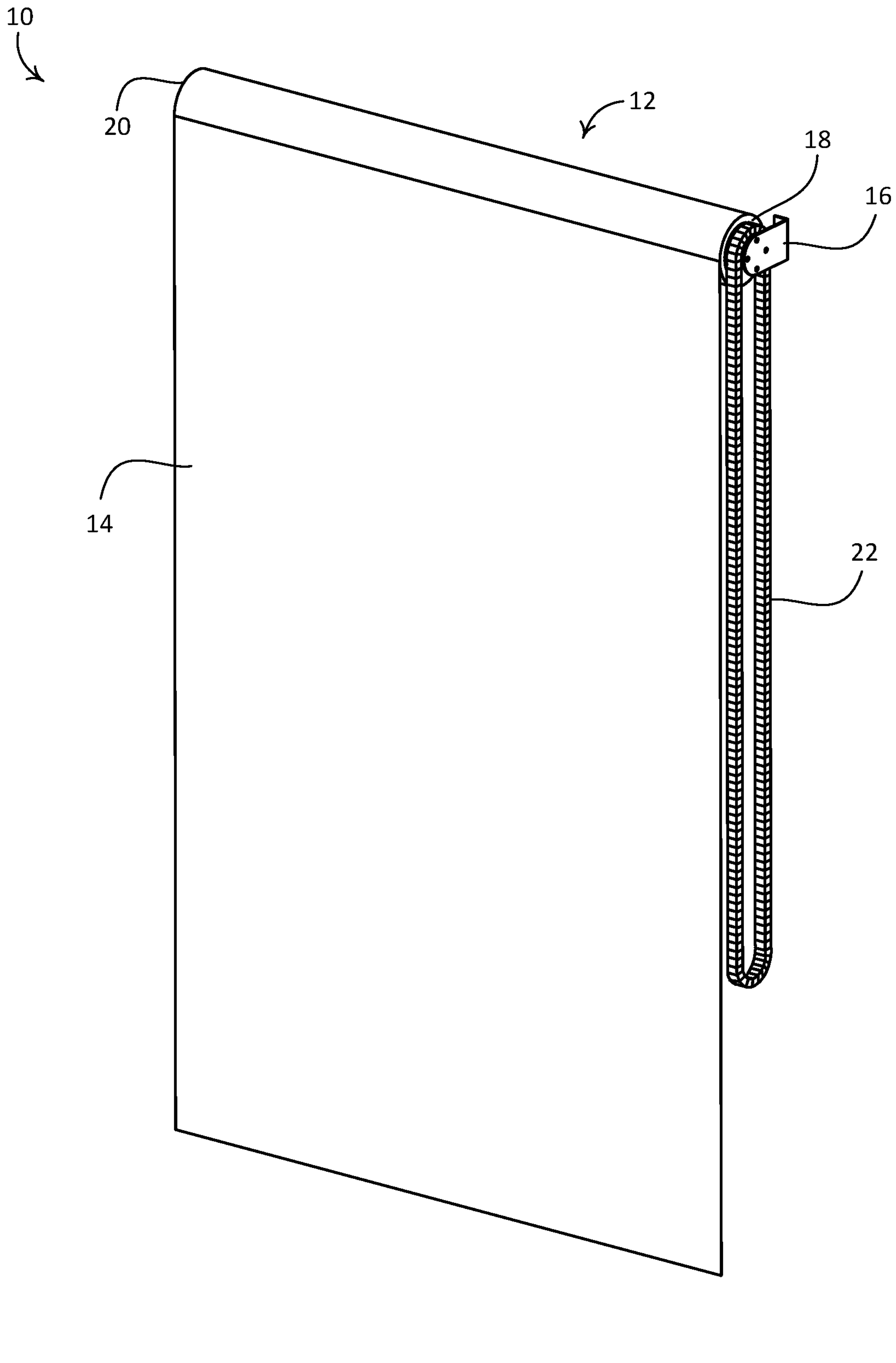
FIG. 1 is an example manual roller shade with a semi-rigid chain assembly.

FIG. 1 depicts an example manual roller shade 10 with a semi-rigid chain assembly 22. The example manual roller shade 10 may include a roller tube 12, a manual clutch mechanism (not shown), a covering material 14, and one or more brackets 16. The covering material 14 may be windingly received by the roller tube 12. The roller tube 12 may be elongate from a first end 18 to a second end 20. The manual clutch mechanism may be located at the first end 18 of the roller tube 12. The manual clutch mechanism may be bi-directional to provide for raising and lowering of the covering material 14. The covering material may be a flexible shade fabric. The manual clutch mechanism may be configured to rotatingly drive the roller tube 12. The manual clutch mechanism may be configured to prevent back-driving of the roller tube 12 that could otherwise occur, for example, if a pulling force was applied to a lower end of the covering material 14 supported by the roller tube 12. An example of a manual clutch mechanism is described in greater detail in commonly-assigned U.S. Patent Application Publication No. 2010/0219306, published Sep. 2, 2010, entitled MANUAL ROLLER SHADE HAVING CLUTCH MECHANISM, CHAIN GUIDE AND UNIVERSAL MOUNTING, the entire disclosure of which is hereby incorporated by reference.

The manual roller shade 10 may include an idler assembly (not shown). The idler assembly may be located adjacent to the second end 20 of the roller tube 12 opposite the manual clutch mechanism. The idler assembly may provide rotatable support for the roller tube 12 at the second end 20 of the roller tube 12. The brackets 16 may be located at opposite ends of the manual roller shade 10 for supporting the manual roller shade 10 from a fixed support surface such as a wall or ceiling of a structure, for example.

The semi-rigid chain assembly 22 may be a drive chain. The semi-rigid chain assembly 22 may be received by the roller tube 12. For example, the semi-rigid chain assembly 22 may be received by the manual clutch mechanism such that oppositely-located (e.g., front and rear) portions of the semi-rigid chain assembly 22 hang from the manual clutch mechanism. For example, the semi-rigid chain assembly 22 may be free hanging such that a lower portion of the semi-rigid chain assembly 22 is not anchored. For example, the lower portion of the semi-rigid chain assembly 22 may not require a tensioner. As another example, the semi-rigid chain assembly 22 may be configured to be anchored such that the lower portion of the semi-rigid chain assembly 22 operates around an anchor and/or tensioner. The semi-rigid chain assembly 22 may form a loop, e.g., a continuous loop.

The semi-rigid chain assembly 22 may be configured to rotate the roller tube 12. For example, the semi-rigid chain assembly 22 may be configured to provide for a sufficient number of rotations of the roller tube 12 for raising or lowering the covering material 14 when a pulling force is applied to a front or rear portion of the semi-rigid chain assembly 22. Each of the opposite hanging portions of the semi-rigid chain assembly 22 may be configured to be graspable by a user such that a pulling force can be applied to each respective hanging portion for drivingly rotating the roller tube 12 to either wind or unwind the covering material 14. For example, when a pulling force is applied to a respective hanging portion of the semi-rigid chain assembly 22, the semi-rigid chain assembly may rotate a drive element (e.g., such as a drive pulley) of the manual roller shade 10. Rotation of the drive element may cause the roller tube 12 to rotate such that the covering material 14 is raised or lowered. For example, the semi-rigid chain assembly 22 may be operatively coupled to the drive element.

Figure 2:
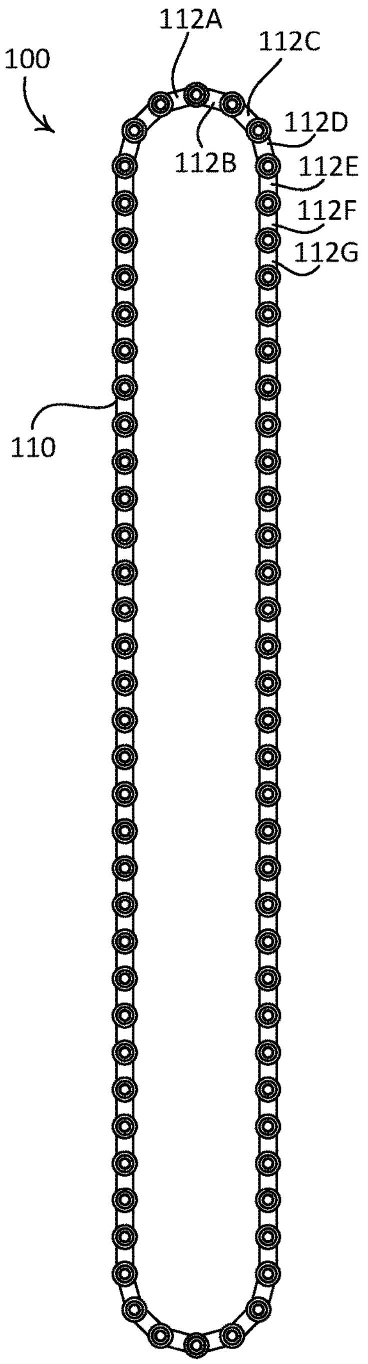
FIG. 2 is a side view of an example semi-rigid chain assembly.
Figure 3:
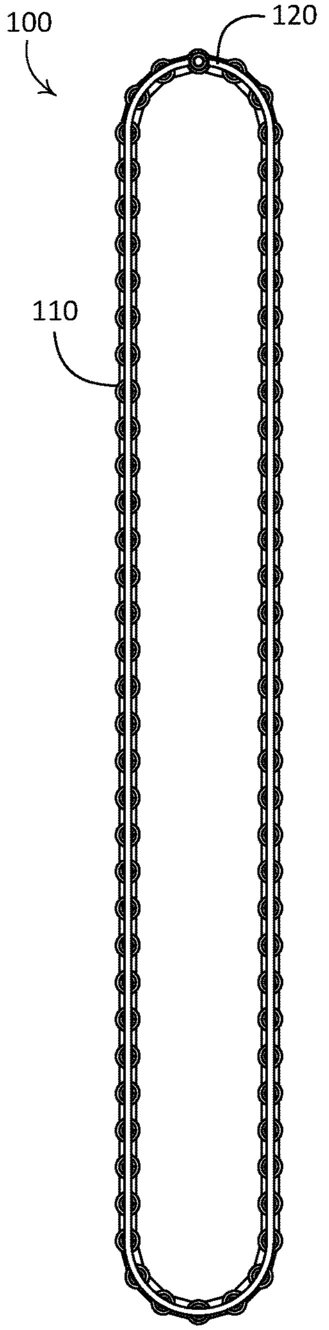
FIG. 3 is a side cross-section view of the example semi-rigid chain assembly shown in FIG. 2.

FIG. 2 is a side view and FIG. 3 is a side cross section view of an example semi-rigid chain assembly 100 (e.g., such as the semi-rigid chain assembly 22 shown in FIG. 1). The semi-rigid chain assembly 100 may be configured to be free hanging from a roller tube (e.g., such as the roller tube 12 shown in FIG. 1). For example, a top portion of the semi-rigid chain assembly 100 may operate around a roller tube and a bottom portion of the semi-rigid chain assembly 100 may be free hanging. For example, the semi-rigid chain assembly 100 may not require a tensioner. The semi-rigid chain assembly 100 may be configured to limit a size of a loop that can be formed by the semi-rigid chain assembly 100. For example, the semi-rigid chain assembly 100 may be configured to define the size of the loop that can be formed by the semi-rigid chain assembly 100. The semi-rigid chain assembly 100 may include a hollow chain 110 and a stiffening rod 120. The hollow chain 110 may be a plastic beaded chain, for example.

Figure 4:
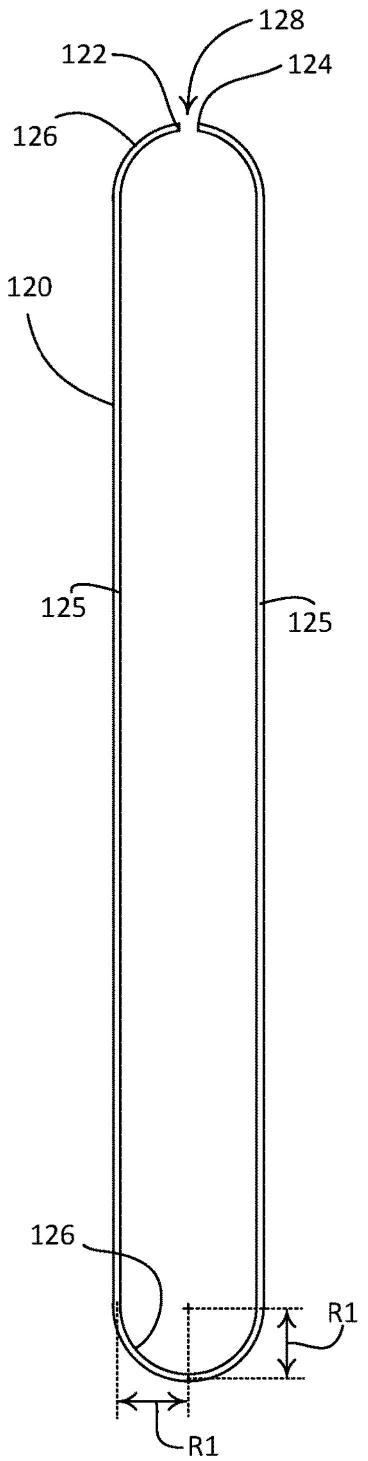
FIG. 4 is a side view of an example stiffening rod of the example semi-rigid chain assembly shown in FIG. 2.

FIG. 4 is a side view of the stiffening rod 120. The stiffening rod 120 may be a spring steel stiffening rod. For example, the stiffening rod may be a spring wire having a diameter of 0.009 inches. The stiffening rod 120 may define a first end 122 and a second end 124. The stiffening rod 120 may be formed into a loop such that the first end 122 is proximate to the second end 124. The loop may define an operational path for the semi-rigid chain assembly 100. The stiffening rod 120 may define a size and/or a shape of the loop. For example, the stiffening rod may be a fixed inner structure that defines the loop (e.g., the size and/or the shape of the loop). The stiffening rod 120 may be oblong with straight section 125 in the middle and curved sections 126 at opposed ends. The curved sections 126 may have a radius R1. The radius R1 may define the maximum bend radius of the semi-rigid chain assembly 100. For example, the stiffening rod 120 may have a maximum bend radius of 0.75 in to 1.0 in. Although FIG. 3 depicts the curved sections of the stiffening rod 120 as having the same radius (e.g., the radius R1), the curved sections 126 may have different radii. For example, an upper curved section may have a first radius and the lower curved section may have a second radius. The first radius may be configured based on a size of a drive element of the roller tube. The second radius may be less than the first radius and may be configured to limit the size and/or shape of the stiffening rod 120 (e.g., the lower curved section of the stiffening rod 120).

The stiffening rod 120 may define an opening 128 between the first end 122 and the second end 124. In addition, the first end 122 and the second end 124 may be connected such that the stiffening rod 120 forms a continuous loop. For example, the first end 122 and the second end 124 may be connected via soldering, die-attaching, or the like.

The stiffening rod 120 may be located within the hollow chain 110. The hollow chain 110 may be a flexible outer housing that may be configured to operate along the stiffening rod 120. For example, the hollow chain 110 may be configured to surround and operate along the stiffening rod 120. The hollow chain 110 may include multiple links 112. Each of the multiple links 112 may be hollow such that the multiple links 112 are configured to surround the stiffening rod 120.

Figure 5:
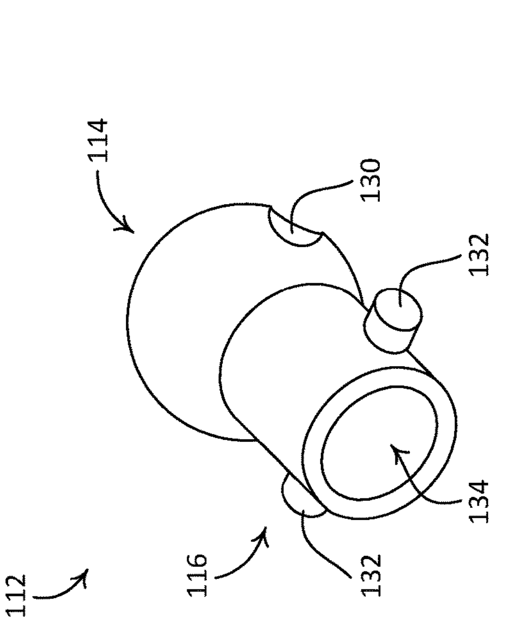
FIG. 5 is a perspective view of an example link of the example semi-rigid chain assembly shown in FIG. 2.

FIG. 5 is a perspective view of an example link of the multiple links 112 of the example semi-rigid chain assembly 100 shown in FIG. 2. Each of the links 112 may define a first end 114 and a second end 116. The first end 114 may be a female portion of the link 112. The first end 114 may have a spherical shape. The second end 116 may be a male portion of the link 112. The second end 116 may have a cylindrical shape. The first end 114 of each link 112 may be configured to receive a second end 116 of another link 112. The first end 114 may be configured to pivot around the second end 116. For example, the first end 114 and the second end 116 of the link 112 may be configured such that the hollow chain 110 can form a shape corresponding to the loop formed by the stiffening rod 120.

The first end 114 of the link 112 may include a set of holes 130. The holes 130 may be located at opposed sides of the link 112. The second end 116 of the link 112 may define studs 132. The studs 132 may be located at opposed sides of the link 112. The holes 130 and the studs 132 may be aligned. The link 112 may define a bore 134 therethrough. The bore 134 may extend through the first end 114 and the second end 116. The bore 134 may be cylindrical in the second end 116. The bore 134 may be spherical in the first end 114. For example, the bore 134 may be larger within the second end 116 than within the first end 114. The bore 134 in the first end 114 may be configured to allow the second end 116 of another link 112 to pivot within the first end 114 of the link 112.

The hollow chain 110 may be configured to rotate a roller tube of a window treatment (e.g., such as roller tube 12 shown in FIG. 1). The hollow chain 110 may engage a drive element of the window treatment. For example, the spherical second end 116 of each of the links 112 may be configured to engage notches of a sprocket (not shown) of the drive element. The hollow chain 110 may be operatively coupled to the drive element of the window treatment such that a pulling force applied to the hollow chain 110 is transferred to a rotation force at the roller tube. The pulling force may be applied in a clockwise or counter-clockwise direction to raise or lower, respectively, the covering material of the window treatment.

Figure 6:
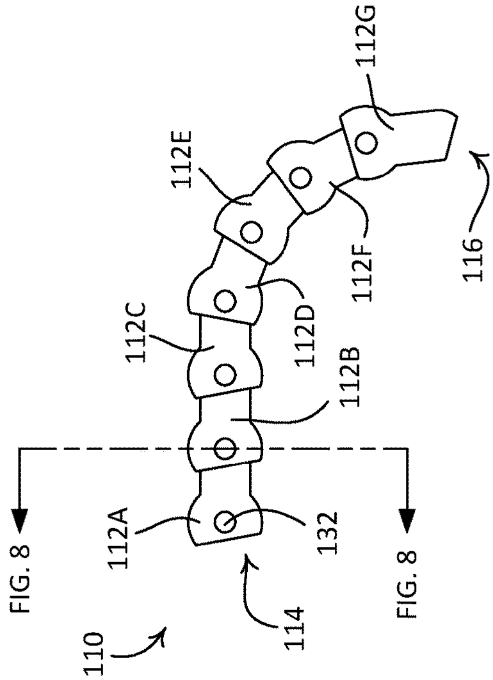
FIG. 6 is a side view of multiple links of the example semi-rigid chain assembly shown in FIG. 2.

FIG. 6 depicts a side view of multiple links 112 of the example semi-rigid chain assembly 100 shown in FIG. 2. The multiple links 112 (e.g., links 112A, 112B, 112C, 112D, 112E, 112F, 112G) may be connected together to form a continuous chain. Each of the multiple links 112 may be configured to be connected to two other links. For example, link 112A may be connected to link 112B. Link 112B may be connected to link 112A and link 112C, and so forth. Although the links 112 are shown to be connected using the studs 132 and the corresponding holes 130, the links 112 may be connected together using hinge pins, clips, other fasteners, or some other fastening design.

Figure 7:
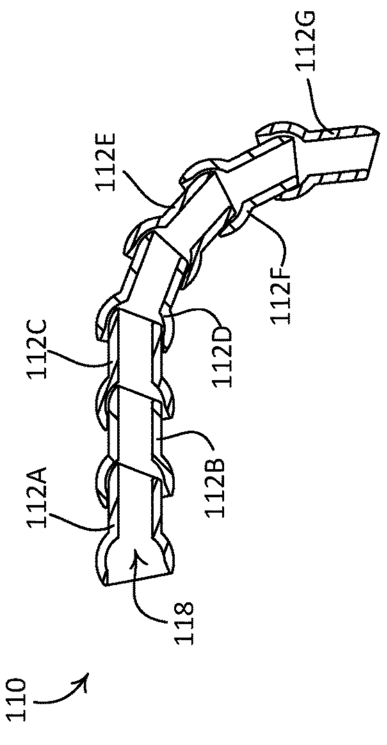
FIG. 7 is a side cross-section view of the multiple links shown in FIG. 6.

FIG. 7 depicts a side cross-section view of the multiple links 112 shown in FIG. 6 (e.g., taken through the center of the links) without the stiffening rod 120 shown. The hollow chain 110 may define a chamber 118 through the multiple links 112. For example, each of the links 112 (e.g., links

112A, 112B, 112C, 112D, 112E, 112F, 112G) may define the chamber 118. The chamber 118 may be configured to accept the stiffening rod 120. The chamber 118 may be configured such that the hollow chain 110 can form a shape corresponding to the loop formed by the stiffening rod 120.

Figure 8:
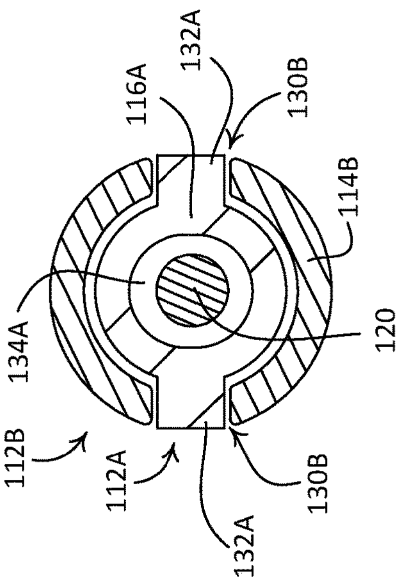
FIG. 8 is a cross-section view through a set of studs defined by a link of the multiple links shown in FIG. 6.

FIG. 8 depicts a cross-section view through a set of studs defined by a link of the multiple links 112 (e.g., taken through the line shown in FIG. 6) with the stiffening rod 120 shown. For example, a first link 112B may receive a second link 112A. For example, a female portion 114B of the first link 112B may be configured to receive a male portion 114A of the second link 112A. The studs 132A of the second link 112A may be received by the holes 130B of the first link 112B. For example, the first link 112B may be configured to be connected to the second link 112A via the studs 132A and the corresponding holes 130B. The bore 134A of the second link 112A may be accessible via the first link 112B.

The invention claimed is:

1. A window treatment system comprising:

a roller tube that is supported at opposed ends thereof;

a covering material that is attached to the roller tube, the covering material operable between a raised position and a lowered position via rotation of the roller tube; and a chain assembly configured to be operated by a user to rotate the roller tube, wherein the chain assembly includes:

a chain comprising a plurality of links, each of the plurality of links having a bore extending therethrough, and a rod extending through the bore of each of the plurality of links of the chain, such that the chain is operable to move relative to the rod along a length of the rod.

2. The window treatment system of claim 1, wherein each of the plurality of links comprises a first end having a spherical shape and a second end having a cylindrical shape.

3. The window treatment system of claim 2, wherein the first end of each of the plurality of links has a set of holes and the second end of each of the plurality of links has a set of studs.

4. The window treatment system of claim 3, wherein the set of holes of each of the plurality of links is connected to the set of studs of an adjacent one of the plurality of links of the chain.

5. The window treatment system of claim 4, wherein the second end of each of the plurality of links is received within the bore in the first end of the adjacent one of the plurality of links of the chain.

6. The window treatment system of claim 5, wherein the second end of each of the plurality of links is configured to pivot within the bore in the first end of the adjacent one of the plurality of links of the chain.

7. The window treatment system of claim 6, wherein the bore is spherical in shape in the first end of each of the plurality of links and the bore is cylindrical in shape in the second end of each of the plurality of links.

8. The window treatment system of claim 2, further comprising:

a drive element coupled to the roller tube, wherein rotation of the drive element causes the roller tube to rotate for raising and lowering the covering material;

wherein the first ends of the plurality of links of the chain engage the drive element, such that operation of the chain assembly rotates the roller tube.

9. The window treatment system of claim 1, wherein the plurality of links of the chain are connected together to form a continuous loop.

10. The window treatment system of claim 9, wherein the rod defines a shape of the continuous loop.

11. The window treatment system of claim 1, wherein the chain assembly is configured to limit a size of a loop that can be formed by the chain assembly.

12. The window treatment system of claim 1, wherein the rod is a spring steel stiffening rod and the chain is a hollow plastic beaded chain.

13. A chain assembly for a window treatment system having a covering material, the chain assembly comprising:

a chain configured to be operated by a user to raise and lower the covering material of the window treatment system, the chain comprising a plurality of links, each of the plurality of links having a bore extending therethrough; and a rod extending through the bore of each of the plurality of links of the chain, such that the chain is operable to move relative to the rod along a length of the rod.

14. The chain assembly of claim 13, wherein each of the plurality of links comprises a first end having a spherical shape and a second end having a cylindrical shape.

15. The chain assembly of claim 14, wherein the first end of each of the plurality of links has a set of holes and the second end of each of the plurality of links has a set of studs.

16. The chain assembly of claim 15, wherein the set of holes of each of the plurality of links is connected to the set of studs of an adjacent one of the plurality of links of the chain.

17. The chain assembly of claim 16, wherein the second end of each of the plurality of links is received within the bore in the first end of the adjacent one of the plurality of links of the chain.

18. The chain assembly of claim 17, wherein the second end of each of the plurality of links is configured to pivot within the bore in the first end of the adjacent one of the plurality of links of the chain.

19. The chain assembly of claim 18, wherein the bore is spherical in shape in the first end of each of the plurality of links and the bore is cylindrical in shape in the second end of each of the plurality of links.

20. The chain assembly of claim 13, wherein the plurality of links of the chain are connected together to form a continuous loop.

21. The chain assembly of claim 20, wherein the rod defines a shape of the continuous loop.

22. The chain assembly of claim 13, wherein the chain assembly is configured to limit a size of a loop that can be formed by the chain assembly.

* * * * *